Feb. 20, 1923.
S. F. EWART
TRANSMISSION GEAR
Filed Nov. 22, 1920
1,446,037
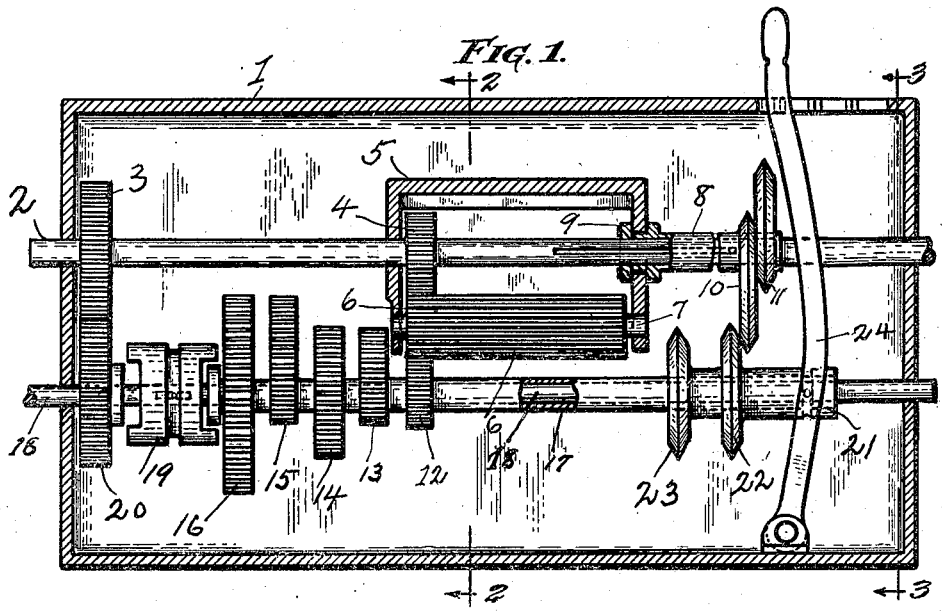
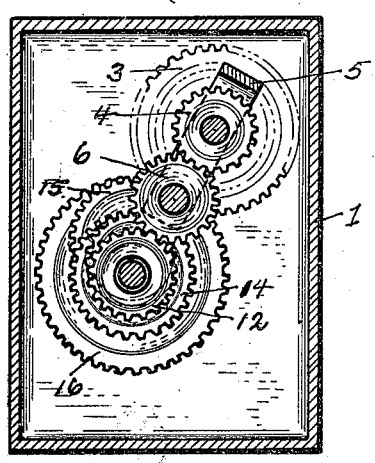
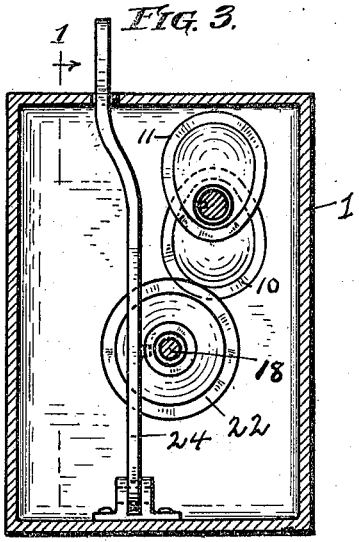
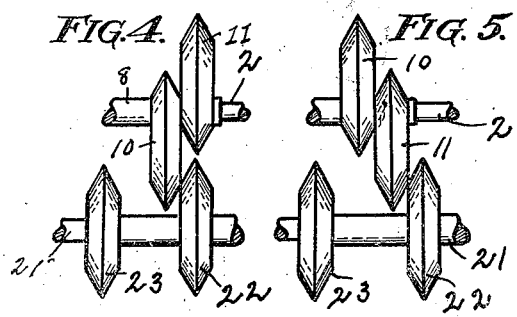
Samuel F. Ewart
INVENTOR.
BY John H. Roney
his ATTORNEY.

Patented Feb. 20, 1923.

1,446,037

UNITED STATES PATENT OFFICE.

SAMUEL F. EWART, OF COAL VALLEY, PENNSYLVANIA.

TRANSMISSION GEAR.

Application filed November 22, 1920. Serial No. 425,681.

*To all whom it may concern:*

Be it known that I, SAMUEL F. EWART, a citizen of the United States, residing at Coal Valley, in the county of Allegheny and State of Pennsylvania, have invented a new and useful Improvement in Transmission Gears, of which improvement the following is a specification.

My invention relates to improvements in transmission mechanism. The object of the invention is to produce a simple and efficient speed transmission device, by the use of which transition from one speed to another can be accomplished, without disengaging the transmission gears, and thus avoid danger of stripping the gears. I accomplish this object by means of the device hereinafter more specifically described, reference being had to the accompanying drawings, forming part hereof, in which Fig. 1 is a section on line 1—1 of Fig. 3.

Fig. 2 is a section on line 2—2 of Fig. 1.

Fig. 3 is a section on line 3—3 of Fig. 1.

Fig. 4 is an elevation of discs, showing position of same, after first movement of lever.

Fig. 5 is the same, showing position of the discs immediately preceding the second movement of lever.

Referring to said drawings, 1 is the transmission case in which the operative mechanism is supported. The said mechanism comprises the power or engine shaft, 2, journalled in the ends of said case, having mounted thereon the gears, 3, 4. The said gear, 4, is enclosed within the box or frame, 5, and is in constant mesh with a long faced gear, 6, mounted upon the shaft, 7, the ends of which are journalled in the lower end of said frame, 5. The said box or frame is slidably mounted upon the said shaft, 2, and is connected at one end to a sleeve, 8, by means of the collar, 9, the said sleeve being also slidably mounted on said shaft. The end of said sleeve, opposite to said collar, has mounted thereon the eccentric discs, 10, 11. The said long faced gear, 6, is adapted to mesh with and transmit power to the gears, 12, 13, 14, 15 and 16, which are mounted upon a sleeve, 17, which is mounted upon the drive shaft, 18, the said gears 12, 14 and 16 being concentrically disposed on said sleeve and the gears, 13 and 15, eccentrically mounted thereon. The said drive shaft, 18, at one end is provided with a clutch member, 19, which is adapted to rigidly fasten the idler gear wheel, 20, upon said shaft, and also to rigidly fasten the sleeve, 17, upon said shaft, depending upon which direction said clutch member is moved by a lever, not shown, of any suitable character. On the end of said sleeve, 17, opposite the end adjacent said clutch, a thimble or sleeve, 21, having mounted thereon or integral therewith the concentric discs, 22, 23, the said sleeve, 21, being slidably mounted upon said sleeve, 17, is adapted to be reciprocated thereon through the agency of the lever, 24, which is connected with said thimble, 21. The gear, 3, on the shaft, 2, meshes with and transmits power and motion to the said idler, 20, and to the drive shaft, 18, when the said idler is clutched fast on said shaft, to reverse the direction of travel of said shaft, 18.

The operation of the device is as follows: Power being applied, the shaft, 2, and sleeve, 8, keyed thereon, are caused to revolve, whereby motion and power is transmitted to the drive shaft, 18, and connected parts, through the gears, the clutch member being in position to fasten the sleeve, 17, to said shaft, 18. The lever, 24, being in the position shown in Fig. 1, by releasing the lever and throwing it towards the right at any time the short radius of disc, 10, being above the edge of disc, 22, moves the said sleeve, 21, towards the right a sufficient distance to bring the medial line of said disk 10 slightly to the left of the medial line of disk 22, the lever then being engaged in the second notch and thus locked, the continued revolution of the sleeve, 8, carries the left-handed inclined edge of disc, 10, into contact with the right-handed corresponding edge of disc, 22, and moves the frame, 4, and connected parts, towards the left, carrying the long faced gear into mesh with gear, 13; the continued revolution of the sleeve, 8, brings the disk 11 into similar relation to disk 22 and carries the beveled edge of the disc, 11, into contact with the correspondingly beveled edge of the disc, 22, and moves the frame, 4, and connected parts, a greater distance towards the left, carrying the long faced gear, 6, into mesh with gear, 14, and brings the discs, 10 and 11, between the discs, 22 and 23, as shown in Fig. 5. At any time, when the short radius of disc, 10, is above the edge of disc, 23, a further movement of the lever towards the right and locked position places discs 10 and 11 in a position with relation to disk 23 similar to that of discs 10 and 11 with disk 22 in the beginning of the operation, and the revolution of shaft, 2, and sleeve, 8, causes the discs 10 and 11 in their order to engage disc, 23, in a manner similar to their engagement with disc, 22, causing the frame and connected parts to travel its maximum travel towards the left, carrying the long faced gear, 6, finally into mesh with gear, 16, When the speed is to be reversed, the lever is operated as heretofore described, but in a reverse direction.

Having described my invention, what I claim and desire to secure by Letters Patent, is:

1. In a transmission device, the combination of a frame, a power shaft journalled in the sides of said frame, a drive shaft parallel with said power shaft, a frame slidably mounted on said power shaft, and carrying a long faced gear wheel, a gear mounted on said shaft adapted to mesh with said long faced gear wheel, a sleeve mounted upon the drive shaft, a plurality of gear wheels of varying diameter keyed upon said sleeve, means to throw the long faced gear into mesh with said gears successively without being disengaged and to maintain said long faced gear in mesh with some one of said gear wheels at all times.

2. In a transmission device, the combination of a frame, a power shaft journalled in the side of said frame, a drive shaft arranged below and parallel with said power shaft, a frame slidably mounted on said power shaft, the said frame carrying a long faced gear wheel, a gear mounted on said shaft adapted to mesh with said long faced gear wheel, a sleeve mounted upon the drive shaft, a plurality of gears keyed upon said sleeve, the said gears being of varying diameter, the first of said gears being concentrically disposed upon said sleeve and the gears alternating between said first mentioned gear and the last gear on said sleeve being eccentrically mounted on said sleeve, a sleeve slidably mounted upon the first mentioned sleeve, a plurality of discs, concentrically mounted on said slidable disc, a plurality of eccentrically disposed discs mounted upon a sleeve mounted on the power shaft, means to cause the engagement of said eccentric discs with the opposite edges of said concentric discs, whereby the frame is reciprocated or moved upon said power shaft, and the long faced gear wheel caused to engage with the gear mounted on the driving shaft.

3. In a transmission device, the combination of a frame, a power shaft mounted in said frame, a driving shaft mounted in said frame, parallel with said power shaft, a frame slidably mounted upon said power shaft, carrying a long faced gear wheel, a gear wheel mounted on said power shaft within said box adapted to mesh with said long faced gear wheel, a sleeve loosely mounted upon said driving shaft, a plurality of gear wheels of varying diameter mounted upon said sleeve, means to cause the long faced gear to mesh with successively the said gear wheel mounted upon said sleeve, and a clutch member mounted upon said driving shaft, adapted to connect the said sleeve with said drive shaft, whereby when said long faced gear is moved into and out of mesh with said gears on said sleeve, the speed transmitted to said drive shaft is varied.

In testimony whereof, I have hereunto signed my name in the presence of two subscribing witnesses.

SAMUEL F. EWART.

In the presence of—
 JOHN H. RONEY,
 CLARENCE A. WILLIAMS.